Figures 1, 2:
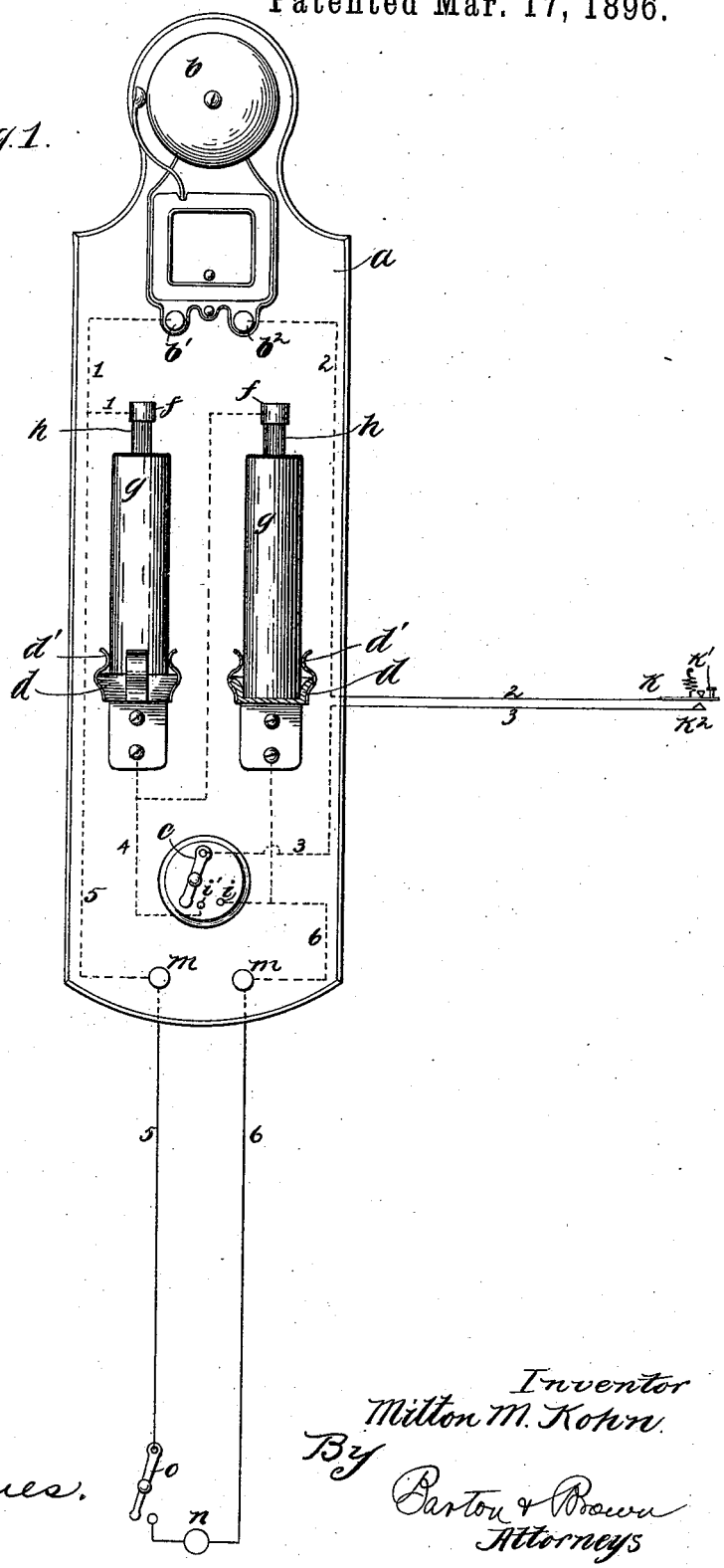

(No Model.)

M. M. KOHN.
BATTERY CONNECTION.

No. 556,544. Patented Mar. 17, 1896.

Witnesses:
George L. Cragg.
W. Clyde Jones.

Inventor
Milton M. Kohn.
By Barton & Brown
Attorneys

UNITED STATES PATENT OFFICE.

MILTON M. KOHN, OF CHICAGO, ILLINOIS.

BATTERY CONNECTION.

SPECIFICATION forming part of Letters Patent No. 556,544, dated March 17, 1896.

Application filed July 29, 1895. Serial No. 557,422. (No model.)

*To all whom it may concern:*

Be it known that I, MILTON M. KOHN, a citizen of the United States, residing at Chicago, in the county of Cook and State of Illinois, have invented a certain new and useful Improvement in Battery Connections, (Case No. 1,) of which the following is a full, clear, concise, and exact description, reference being had to the accompanying drawings, forming a part of this specification.

My invention relates to battery connections, its object being to provide improved means for mounting a battery in connection with the translating device it is adapted to supply with current, and, furthermore, to provide improved means for securing the battery in its support and completing the circuit between the poles of the battery and the electrical contacts extending to the translating device without the intervention of binding-posts or other manipulated parts.

In the employment of bells, spark-coils, therapeutic coils, and the like, adapted to be supplied with current from a battery, it has been the custom to mount the translating device, whatever it may be, in the position where it is desired to be used and to connect the same by wires, usually concealed in the wall, with a battery or cell of batteries located in a closet or other concealed locality. Considerable difficulty is thus experienced due to the wiring, and further objection results from the fact that it is often desirable to change the location of the translating device, which cannot be readily done in the constructions heretofore employed. With these objections in view the object of the present invention is to provide an arrangement whereby the battery may be mounted upon the same base-board or support that carries the translating device, the electrical connections between the battery-terminals and the translating device being made preferably upon the rear of the board. The battery is preferably formed with a metallic casing, and thus may be plated, polished, or otherwise worked to present a pleasing appearance, so that the battery may form an ornament rather than otherwise. I preferably provide a socket upon the board, into which the cell is adapted to be placed, the socket making electrical contact with the casing of the cell, which is electrically connected with one pole of the battery to thus complete the circuit. A terminal insulated from the casing and connected with the opposite pole of the battery is adapted when the cell is placed in the socket to engage a spring to thus complete the circuit between the battery and the electrical connections upon the board.

My invention will be more readily understood by reference to the accompanying drawings, in which—

Figure 1 is an elevation showing two cells of battery mounted and supported in accordance with my invention. Fig. 2 is a detail view of one of the supporting-springs.

Like parts are indicated by similar letters and numerals of reference in both views.

The base-board $a$ may be secured to the wall or other support. Mounted upon the base-board are the alarm-bell $b$, cut-off switch $c$, the supports $d$, and the studs $e$, upon which are mounted the springs $f$, adapted to secure the batteries in their position within the supports $d$.

In the drawings I have shown dry batteries provided with metallic cylindrical casings $g$ $g$, connected with one pole of the batteries, and metallic extensions $h$ $h$ of the opposite poles of the said batteries.

The supports $d$ are provided with springs $d'$ to insure good contact with the casings $g$. The springs are flared, as shown, to guide the batteries properly to their seats.

The springs $f$ are mounted within slots provided in the studs $e$, as shown in Fig. 2. The studs in turn are provided with threaded extensions $e'$, which pass through apertures in the board $a$ and upon which are screwed the nuts $e^2$ to secure the studs in position.

The springs $f$ are preferably provided with U-shaped ends, as shown in Fig. 2, adapted to receive the metallic extensions $h$ and to secure the same firmly, whereby the batteries are rigidly secured in position.

The bell $b$ is connected in the battery-circuit, which is traced from the battery on the right through the contact $i$ and the switch-lever, when in engagement therewith; conductor 3, contacts $k^2$ $k'$ of the push-button $k$, which may be located at any desired point; conductor 2, binding-post $b^2$, bell $b$, binding-post $b'$, conductor 1, and the battery on the left to the opposite battery. If it is desired to use but one battery, switch-lever $c$ is thrown upon contact $i'$, thereby affording passage for the current from the battery upon the left through the branch 4, the switch-lever $c$, conductor 3, the push-button $k$, conductor 2, bell $b$, and conductor 1.

It may be desirable to use the batteries for other purposes, in which case I provide one or more sets of binding-posts $m$ $m$, which are connected with the battery, as shown. Conductors 5 6 connect these binding-posts with the translating device $n$, a switch $o$ being provided to control the current to said translating device.

It is obvious that many modifications may be made without departing from the spirit of my invention.

Having thus described my invention, what I claim as new, and desire to secure by Letters Patent, is—

1. The combination with a metallic cup, of a battery-cell provided with a metallic casing connected with one pole of the battery, the end of said casing being adapted to fit into said cup to complete electrical connection therewith and to be supported in position thereby, a terminal provided upon the opposite end of said battery insulated from said casing and connected with the opposite pole of the battery, and contact-springs adapted to grasp said terminal, said contact-springs and said metallic cup forming the terminals of an electric circuit, whereby the battery may be placed in position by a simple movement and without the intervention of binding parts necessitating screwing or other manipulation; substantially as described.

2. The combination with a metallic cup provided with spring-leaves upon the sides, of a battery provided with a metallic casing forming one terminal of the battery, the end of said casing being adapted to fit into said cup and to be engaged by said spring-leaves to thus complete electrical circuit between the cup and the casing and to maintain the battery in position a terminal provided upon the opposite end of said battery, and spring-contacts adapted to grasp said terminal, said spring-contacts and said cup forming the terminals of an electric circuit, whereby the battery may be readily connected into circuit and disconnected therefrom; substantially as described.

In witness whereof I hereunto subscribe my name this 25th day of January, A. D. 1896.

MILTON M. KOHN.

Witnesses:
JOHN W. SINCLAIR,
GEORGE L. CRAGG.